Patented Oct. 20, 1953

2,656,370

UNITED STATES PATENT OFFICE 2,656,370

11α-HYDROXY-4-ANDROSTENE-3,17-DIONE

Herbert C. Murray, Hickory Corners, and Durey H. Peterson, Kalamazoo, Mich., assignors to The Upjohn Company, Kalamazoo, Mich., a corporation of Michigan No Drawing. Application March 19, 1952, Serial No. 277,523

1 Claim. (Cl. 260—397.4)

This invention relates to a new compound, 11α-hydroxyandrostenedione.

An object of this invention is to provide 11α-hydroxyandrostenedione having pharmacological activity. A further object is to prepare an intermediate useful in the synthesis of known 11-oxygenated steroids. The 11α-hydroxyandrostenedione may be converted to the known adrenosterone (4-androstene-3,11,17-trione) by oxidation.

11α-hydroxyandrostenedione may be prepared from androstenedione as described in our applications, of which this is a continuation-in-part, Serial No. 180,496, filed August 19, 1950, and Serial No. 272,944, filed February 23, 1952.

The 11α-hydroxy-4-androstene-3,17-dione has unusual and desirable physical and pharmacological properties. It demonstrates anaesthetic and inhibitory properties in estrogen and leuteoid activities. The thermal stability of the compound renders it particularly useful in reactions and purification techniques at elevated temperature. The susceptibility of the compound to acylation permits protection of the hydroxyl group in oxidation procedures.

The following examples are illustrative of the processes and products of the present invention and are not to be construed as limiting.

Example 1.—11α-hydroxy-4-androstene-3,17-dione

A medium was prepared from five milliliters of corn steep liquor, twenty grams of Edamine commercial lactalbumin digest and fifty milligrams of Cerelose commercial dextrose per liter of tap water and adjusted to a pH of between about 5.5 and 5.9. To four liters of this medium containing a 27 hour growth, at room temperature with aeration, of Rhizopus arrhizus, ATCC 11145, was added one gram of 4-androstene-3,17-dione in sixty milliliters of acetone. The culture was then incubated at room temperature for 64 hours. The pH of the medium was 3.5 and at the end of this time the fermentation liquor and mycelia were extracted successsively with three one-liter portions, one two-liter portion, and one one-liter portion of methylene chloride. The methylene chloride extracts were combined and washed with two 400-milliliter portions of two percent aqueous sodium bicarbonate solution and three 500-milliliter portions of distilled water. The methylene chloride extract was evaporated to dryness in vacuo and the solids were taken up in fifty milliliters of methylene chloride. The solution was transferred to a 100-milliliter beaker and evaporated by a stream of air. Chromatographic separation over an Al₂O₃ packed column yielded three fractions, one of which was 11α-hydroxyandrostenedione.

Example 2.—11α-hydroxy-4-androstene-3,17-dione

A medium was prepared of twenty grams of Edamine enzymatic digest of lactalbumin, three grams of corn steep liquor and fifty grams of technical dextrose diluted to one liter with tap water and adjusted to a pH of 4.3 to 4.5. Four liters of this sterilized medium was inoculated with Rhizopus arrhizus and incubated for 24 hours at a temperature of 28 degrees centigrade using a rate of aeration and stirring such that the oxygen uptake was 6.3 to 7 millimoles per hour per liter of Na₂SO₃ according to the method of Cooper, Fernstrom and Miller, Ind. Eng. Chem., 36, 504 (1944). To this medium containing a 24 hour growth of Rhizopus arrhizus was added one gram of 4-androstene-3,17-dione in 25 milliliters of acetone to provide a suspension of the steroid in the culture. After an additional 24 hour period of incubation under the same conditions of temperature and aeration, the beer and mycelium were extracted. The mycelium was filtered, washed twice, each time with a volume of acetone approximately equal to the volume of the mycelium and extracted twice, each time with a volume of methylene chloride approximately equal to the volume of the mycelium. The acetone and methylene chloride extracts including solvent were added to the beer filtrate. The mixed extracts and beer filtrate were extracted successively with two one-half by volume portions of methylene chloride and then with two one-fourth by volume portions of methylene chloride. The combined methylene chloride extracts were washed with two one-tenth by volume portions of a two percent aqueous solution of sodium bicarbonate and then with two one-tenth by volume portions of water. After drying the methylene chloride with about three to five grams of anhydrous sulfate per liter of solvent and filtering, the solvent was removed by distillation. The extract of 2.09 grams was dissolved in 100 milliliters of benzene and chromatographed over fifty grams of hydrochloric acid washed, 120 degrees centigrade heated alumina with 100 milliliter portions of developing solvent, as indicated in the table.

The crystalline fractions 18 to 21 inclusive were washed with several milliliters of ether. The residue was recrystallized from ten milliliters of ethyl acetate, adding Skellysolve B petroleum naphtha to effect crystallization. After four crystallizations, 240 milligrams of 11α-hydroxy-4-androstene-3,17-dione were obtained, melting at 226 to 227 degrees centigrade. The structure was verified by infrared, ultraviolet spectrum, and oxidation with chromic acid-glacial acetic acid to adrenosterone. Reichstein, Helv. Chim. Acta, 20, 987 (1937) has prepared a different isomer, the 11β-hydroxy-4-androstene-3,17-dione melting at 189 to 190 degrees centigrade. The 11α-hydroxy-4-androstene-3,17-dione has an optical rotation $[\alpha]_D^{24}$ of plus 162 degrees (1.415 in chloroform) and a $k_{242}$ of 50.54.

Analysis: Calculated for $C_{19}H_{26}O_3$: C, 75.46; H, 8.66. Found: C, 75.68; H, 8.53.

Fractions 16 and 17 combined and recrystallized three times from acetone by the addition of Skellysolve B yielded a compound melting at 195 to 196 degrees centigrade, analyzing as $C_{19}H_{26}O_3$ and showing no absorption in the ultraviolet spectrum. Infrared spectrum showed the presence of three ketonic groups.

Analysis: Calculated for $C_{19}H_{26}O_3$: C, 75.46; H, 8.66. Found: C, 75.73; H, 8.68.

TABLE

| Fraction | Solvent | Eluate Solids, Milligrams |
|---|---|---|
| 1,2 | benzene | 322 |
| 3,4 | benzene plus 5 percent ether | 108 |
| 5,6 | benzene plus 10 percent ether | 10 |
| 7,8 | venzene plus 50 percent ether | 12 |
| 9-11 | ether | 15 |
| 12,13 | ether plus 5 percent $CHCl_3$ | 19 |
| 14,15 | ether plus 10 percent $CHCl_3$ | 23 |
| 16,17 | ether plus 50 percent $CHCl_3$ | 80 |
| 18,19 | chloroform | 716 |
| 20,21 | $CHCl_3$ plus 5 percent acetone | 177 |
| 22,23 | $CHCl_3$ plus 10 percent acetone | 71 |
| 24,25 | $CHCl_3$ plus 50 percent acetone | 26 |
| 26,27 | acetone | 41 |
| 28,29 | acetone plus 5 percent methanol | 115 |
| 30,31 | acetone plus 10 percent methanol | 42 |
| 32,33 | acetone plus 50 percent methanol | 40 |
| 34 | methanol | 13 |

We claim:

11α-hydroxy-4-androstene-3,17-dione.

HERBERT C. MURRAY.
DUREY H. PETERSON.

No references cited.